US010259125B2

(12) United States Patent
Houchu et al.

(10) Patent No.: US 10,259,125 B2
(45) Date of Patent: Apr. 16, 2019

(54) DEVICE FOR PREPOSITIONING AND REMOVABLY ATTACHING ARTICULATED LIMBS OF A HUMANOID ROBOT

(71) Applicant: SOFTBANK ROBOTICS EUROPE, Paris (FR)

(72) Inventors: Ludovic Houchu, Beynes (FR); Fabien Mugnier, Paris (FR); Vincent Clerc, Clamart (FR)

( * ) Notice: Subject to any disclaimer, the term of this patent is extended or adjusted under 35 U.S.C. 154(b) by 227 days.

(21) Appl. No.: 15/311,100

(22) PCT Filed: Jun. 1, 2015

(86) PCT No.: PCT/EP2015/062070
§ 371 (c)(1),
(2) Date: Nov. 14, 2016

(87) PCT Pub. No.: WO2015/185474
PCT Pub. Date: Dec. 10, 2015

(65) Prior Publication Data
US 2017/0095933 A1   Apr. 6, 2017

(30) Foreign Application Priority Data
Jun. 5, 2014   (FR) ..................................... 14 55091

(51) Int. Cl.
*B25J 17/00* (2006.01)
*B25J 17/02* (2006.01)
(Continued)

(52) U.S. Cl.
CPC ........... *B25J 17/00* (2013.01); *B25J 19/0066* (2013.01); *Y10S 901/28* (2013.01)

(58) Field of Classification Search
CPC .... A63H 33/06; A63H 33/062; A63H 33/065; A63H 33/067; B25J 19/0066;
(Continued)

(56) References Cited

U.S. PATENT DOCUMENTS 8,661,928 B1 *   3/2014   Tilden ...................... B25J 17/00
                                                          74/490.05
2010/0152894 A1   6/2010   Ha
(Continued)

FOREIGN PATENT DOCUMENTS

JP   2002-227829 A   8/2002
JP   2005-161414 A   6/2005
(Continued)

OTHER PUBLICATIONS

RT-USA, "NASA unveils 6-foot-tall humanoid robot," Dec. 11, 2013, XP055163804 <http://rt.com/usa/nasa-valkyrie-texas-robot-076/>.

*Primary Examiner* — Jake Cook
(74) *Attorney, Agent, or Firm* — Baker & Hostetler LLP (57) ABSTRACT

A mobile robot comprises a trunk and several limbs removably linked to the trunk. Each of the limbs are configured for prepositioning the limb on the trunk, and a single flange is linked to the trunk and configured to removably fix all the limbs to the trunk. Each of the limbs comprises a motorized articulation, via which the limb is positioned and fixed onto the trunk, and can be driven in movement relative to the trunk.

12 Claims, 8 Drawing Sheets

(51) Int. Cl.
*B25J 18/00* (2006.01)
*B25J 19/00* (2006.01)

(58) Field of Classification Search
CPC ........ B25J 17/00; B25J 9/0084; B25J 9/0087; B25J 9/009; Y10S 901/28
See application file for complete search history.

(56) References Cited

U.S. PATENT DOCUMENTS

| | | | |
|---|---|---|---|
| 2012/0048027 A1* | 3/2012 | Hashiguchi | B25J 9/0087 73/763 |
| 2012/0163948 A1* | 6/2012 | Asamizu | B25J 9/0087 414/590 |
| 2014/0137689 A1* | 5/2014 | Nogami | B25J 18/00 74/490.05 |
| 2014/0350707 A1* | 11/2014 | Matsufuji | B25J 9/0087 700/95 |

FOREIGN PATENT DOCUMENTS

| | | |
|---|---|---|
| JP | 2006-116679 A | 5/2006 |
| JP | 2009-018418 A | 1/2009 |

\* cited by examiner

DEVICE FOR PREPOSITIONING AND REMOVABLY ATTACHING ARTICULATED LIMBS OF A HUMANOID ROBOT

CROSS-REFERENCE TO RELATED APPLICATIONS

This application is a National Stage of International patent application PCT/EP2015/062070, filed on Jun. 1, 2015, which claims priority to foreign French patent application No. FR 1455091, filed on Jun. 5, 2014, the disclosures of which are incorporated by reference in their entirety.

FIELD OF THE INVENTION

The invention relates to the field of mobile robotics. It relates to a device for prepositioning and removably fixing articulated limbs of a mobile robot. It relates also to a maintenance method allowing for a simple and rapid replacement of a failing articulated limb with a replacement limb.

BACKGROUND

Humanoid robotics seeks to combine, in one machine, the greatest number of characteristics that resemble a human being. The first aim is to approximate the human by the outer appearance, the morphology or the movements. The humanoid robot generally comprises several motorized articulations capable of moving, by means of an electric motor, one limb relative to another. The most advanced humanoid robots thus comprise legs, arms or hands. They are capable of walking or of dancing in the manner of a human being. They are capable of manipulating, in their hands, objects of various forms. Another aim is to approximate the human by its behavior and its intelligence. The artificial intelligence of the robots is increasingly successful, allowing for an increasingly complex interaction with a human user.

There are many possible applications of human robots. Applications are envisaged in the industrial domain, for example for accessing contaminated zones exhibiting a risk for people. Also envisaged are many applications in the health field, for example for assisting people with a deficiency. Also envisaged is use by a wider public for domestic purposes.

The assumed wide scale deployment intended for the widest possible public is generating new constraints, for example industrial, regulatory or of safety. The design of the most recent generations of robots now incorporates a set of constraints for meeting the emerging regulations. For example, the robot intended for the general public must not offer any safety risk, both in normal operation and in the case of a failure. Maintenance operations have to be able to be carried out, by an experienced operator or by a simple user. The aim is to take into account, in the design of the robot, after-sale-related constraints, for example to allow easy diagnostics and simple and rapid repairability.

SUMMARY OF THE INVENTION

To this end, the subject of the invention is a mobile robot comprising a trunk and several limbs removably linked to the trunk, characterized in that it comprises:
for each of the limbs, means for prepositioning said limb on the trunk, and
a single flange linked to the trunk and configured to removably fix all the limbs to the trunk.

Advantageously, each of the limbs comprises a motorized articulation, via which said limb is positioned and fixed onto the trunk, and can be driven in movement relative to the trunk.

Advantageously, the prepositioning means associated with one of the limbs comprise an imprint formed in the trunk configured to receive the motorized articulation of said limb, and means for clipping the motorized articulation in the imprint, so as to position and hold said limb relative to the trunk by exerting a force greater than a force exerted by gravity between the trunk and said limb.

Advantageously, the clipping means of one of the limbs comprise a set of ridges formed in the motorized articulation cooperating with a set of rails formed in the imprint associated with said limb.

Advantageously, the flange is mobile relative to the trunk between an open position making it possible, for each of the limbs, to position and remove the motorized articulation relative to the trunk, and a closed position in which the flange comes to bear against the motorized articulations of all the limbs; the robot comprising removable fixing means for holding the flange in the closed position.

Advantageously, the flange is linked to the trunk by a pivot link configured to make it possible to displace the flange in rotation, between the open position and the closed position, and configured such that the flange is held in the open position by the effect of gravity.

Advantageously, the robot comprises, for one of the limbs, a first and a second sets of flexible shims, secured respectively to the flange and the imprint associated with said limb, configured to be crushed by ensuring that the motorized articulation is kept positioned and fixed onto the trunk.

Advantageously, the flexible shims consist of an elastomer foam.

Advantageously, the robot comprises, for each of the limbs, removable electronic connection means.

Advantageously, the articulation of one of the limbs is motorized about two or three axes of rotation.

Advantageously, the robot comprises three limbs, one of the limbs articulated about three axes of rotation relative to the trunk being like a head, and two of the limbs articulated about two axes of rotation relative to the trunk and arranged on either side of the trunk being like two arms.

The invention relates also to a method for replacing a failing limb of a robot having the features described previously with a non-failing limb, characterized in that it comprises steps consisting in:
removing the removable fixing means,
displacing the flange to the open position,
removing the failing limb,
prepositioning the non-failing limb in the imprint (32) associated with the failing limb,
displacing the flange to the closed position,
refitting the fixing means.

Advantageously, the method further comprises steps consisting respectively in disconnecting and connecting the electronic connection means between the robot and respectively the failing limb and the non-failing limb.

BRIEF DESCRIPTION OF THE DRAWINGS

The invention will be better understood and other advantages will become apparent on reading the detailed description of an embodiment given by way of example in the following figures.

For clarity, the same elements will bear the same references in the different figures.

DETAILED DESCRIPTION

Figure 1A:
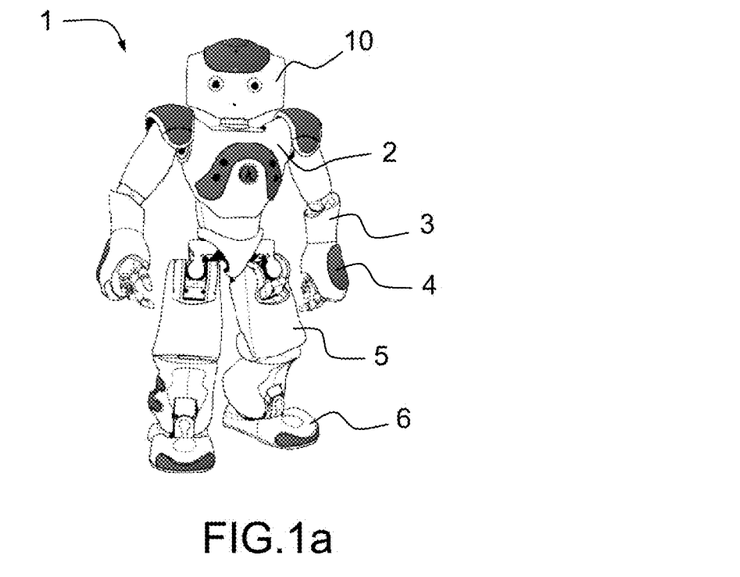
FIGS. 1a and 1b represent two examples of humanoid robots that can be equipped with a preposition and fixing device according to the invention.
Figure 1B:
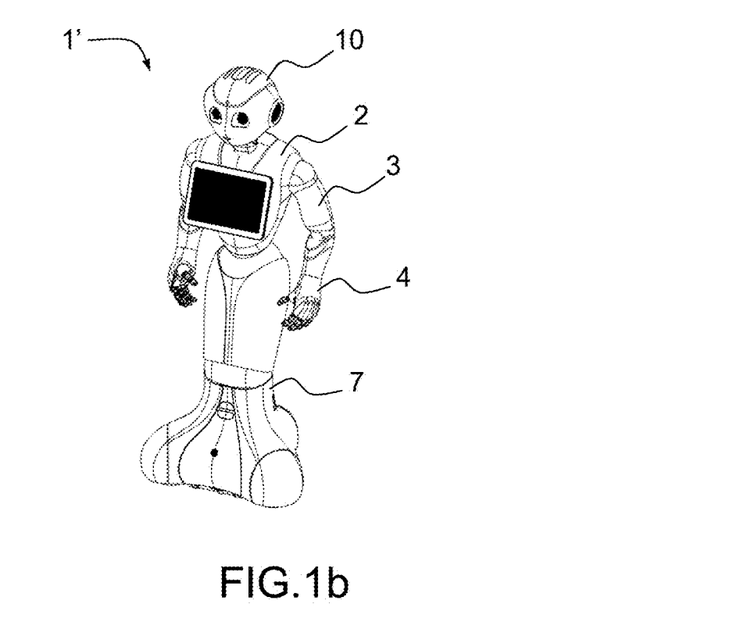

FIGS. 1a and 1b represent two examples of humanoid robots developed by the company ALDEBARAN ROBOTICS™. The humanoid robot 10 represented in FIG. 1a comprises a head 1, a torso 2, two arms 3, two hands 4, two legs 5 and two feet 6. The humanoid robot 10' represented in FIG. 1b comprises a head 1, a torso 2, two arms 3, two hands 4 and a skirt 7. These two robots comprise several articulations allowing the relative movement of the different limbs of the robot in order to reproduce the human morphology and the movements thereof. The robots 10 and 10' comprise, for example, an articulation 11 between the torso 2 and each of the arms 3. The articulation 11 is motorized about two axes of rotation to make it possible to move the arm 3 relative to the torso 2 in the manner of the possible movements by a shoulder of a human being.

The humanoid robot 10 also comprises several articulations for moving the legs of the robot and reproducing the walking movement, in particular articulations that can be likened to a hip, between the torso and the thigh, to a knee, between the thigh and the leg, and to an ankle between the leg and the foot. Several forms of motorized articulations are implemented, moving one of the limbs about one or more degrees of freedom in rotation.

The humanoid robot 10' has a different architecture. To improve the stability and lower the center of gravity of the robot, the robot does not comprise legs but a skirt 7 comprising, in its base, a tripod capable of moving the robot around. The skirt also comprises a first articulation 12 like a knee, between a leg 7a and a thigh 7b. A second articulation 13 like a hip is mounted between the torso 2 and the thigh 7b. These two articulations 12 and 13 are pivot links motorized about an axis of rotation. The axis of rotation Xa of the articulation 12 and the axis of rotation Xb of the articulation 13 are substantially parallel to an axis linking the two shoulders of the robot, making it possible to tilt the robot forward or backward.

The general idea of the present invention consists in linking several limbs to the torso of the robot removable by means a device making it possible to preposition each of the limbs and to fix the limbs using a single flange. The opening of the flange makes it possible to rapidly access the articulations of the limbs. The device allows for an easy replacement operation for a failing limb.

The invention is described herein below for a humanoid robot comprising two arms articulated about two axes of rotation relative to the torso and a head articulated about three axes of rotation. Obviously, the invention is not limited to this particular example. More generally, the device according to the invention can be applied to a robot comprising several limbs articulated relative to a trunk. The robot can be a humanoid-type robot or an animal-type robot, generally referred to as mobile robots. The invention is also applicable to an industrial robot. The articulated limbs are, generally, mechanical subassemblies that are required to move relative to one another or relative to a trunk. A "limb" should be understood herein below to be a mechanical subassembly of the robot like, for example, a leg, a thigh, a torso, a head, an arm, a hand, or a combination thereof. Note too that, while the following figures detail a particular example of an articulation motorized about two or three degrees of freedom, it is understood that the invention applies in principle to any type of articulations, for example an articulation with one, two or three degrees of freedom in rotation, or even an articulation with one or more degrees of freedom in translation. The motor is preferentially an electric motor. Other motors can be envisaged without departing from the scope of the invention, for example a heat or hydraulic motor or even a compressed air motor. In the example, the device makes it possible to preposition and fix three limbs, like two arms and a head. The device does not include any lower limbs such as legs or a skirt. This selection of three limbs is a particular case and the invention covers any selection of several limbs of a robot.

Figure 2A:
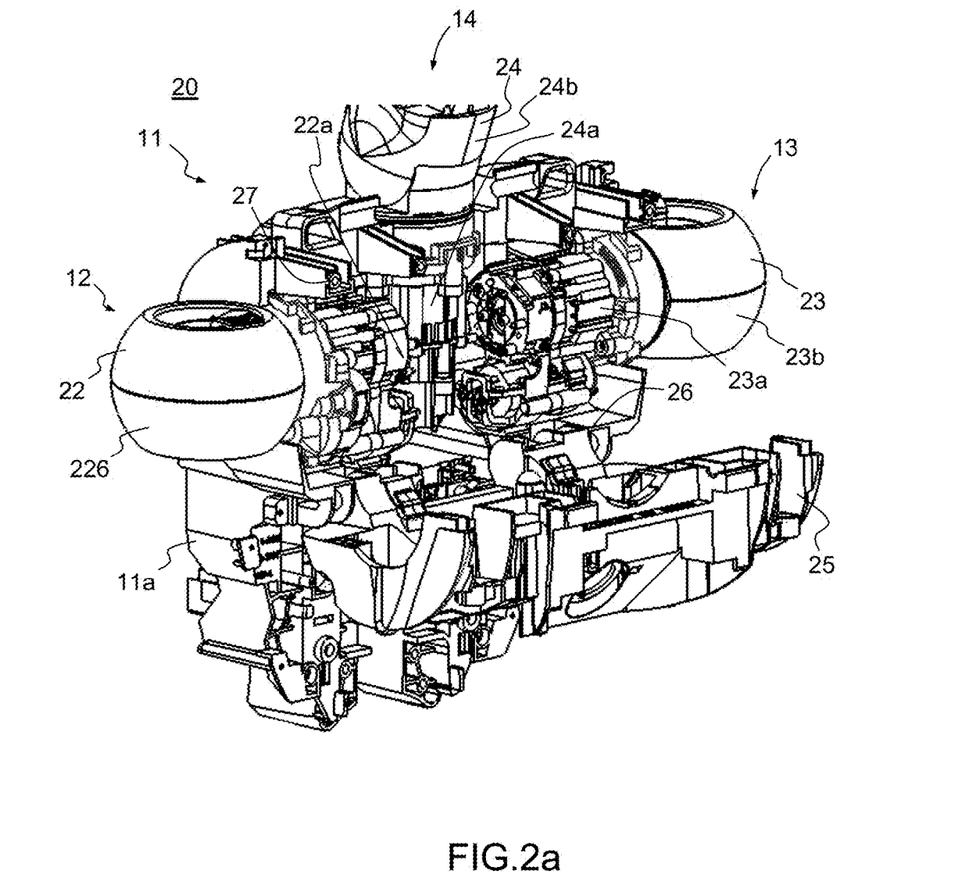
FIGS. 2a, 2b and 2c represent an example of a robot according to the invention comprising a trunk and several articulated limbs fixed to the trunk by means of a flange represented in three distinct positions.
Figure 2B:
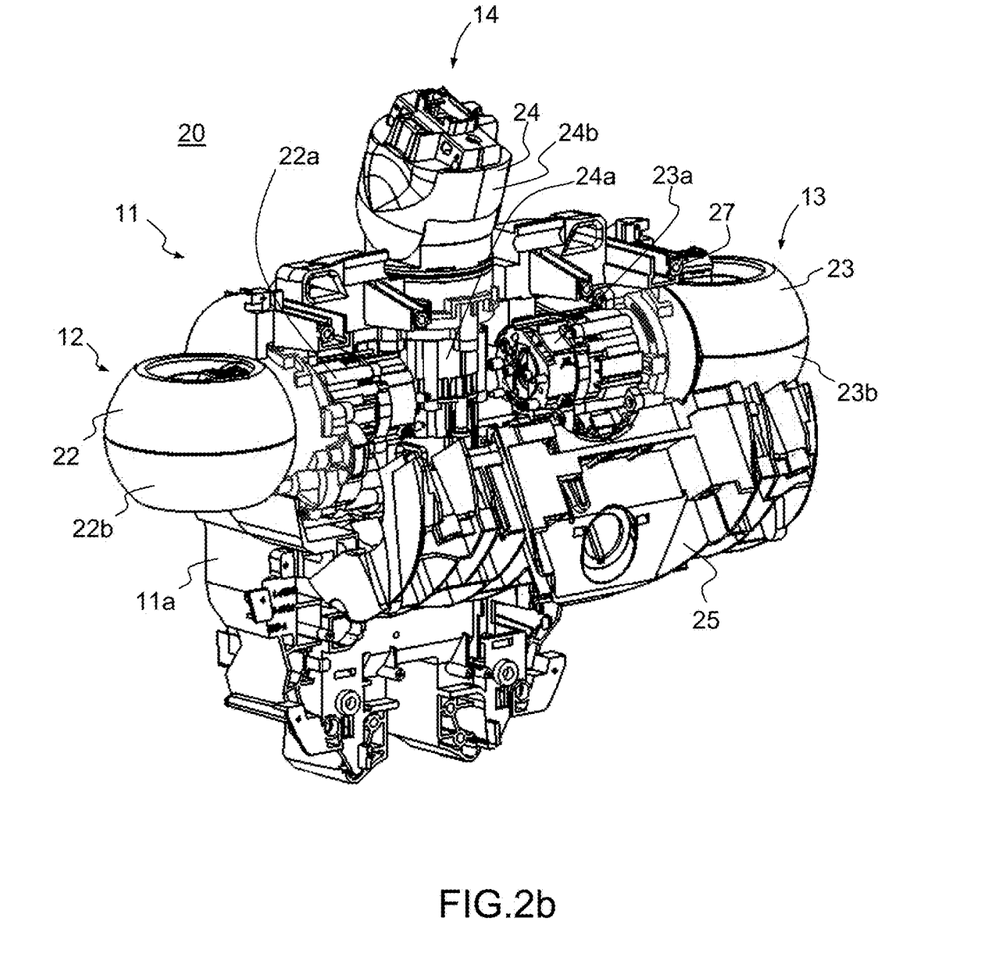
Figure 2C:
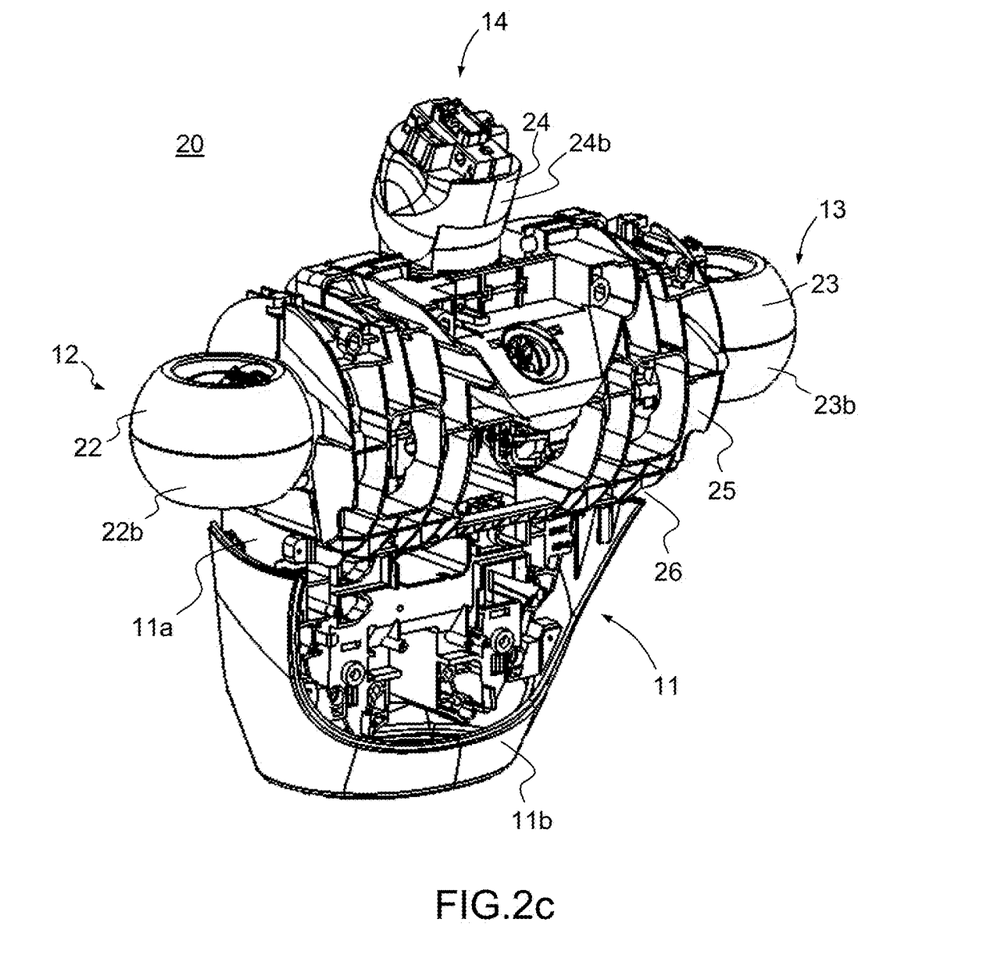

FIGS. 2a, 2b and 2c represent an example of a robot according to the invention comprising a torso and several articulated limbs fixed to the trunk by means of a flange represented in three distinct positions. Hereinafter in the description, the trunk is called torso by analogy with human morphology. The robot 20 comprises a torso 11 and three limbs 12, 13 and 14. Each of the limbs is linked to the torso 11 respectively via motorized articulation 22, 23 and 24. To simplify the reading of the drawings, only the motorized articulation of the limbs is represented. An illustration of the possible form of the limbs can be deduced from FIGS. 1a and 1b already described. In FIGS. 2a to 2c, the robot is represented from the back and in a standing position. By their location and their movements relative to the torso, the limbs 12, 13 and 14 are respectively like a left arm, a right arm and a head. The robot can also comprise one or more of the lower limbs not represented in FIGS. 2a to 2c, which can be similar to those represented in FIGS. 1a and 1b.

The torso 11 of the robot 20 comprises a cellular supporting structure 11a and an outer shell 11b. The supporting structure 11a preferentially consists of a rigid thermoplastic material. Various equipment items can be fixed to the structure 11a such as, for example, electronic modules or storage batteries.

The articulations 22 and 23 of the arms 12 and 13 are two links motorized about two axes of rotation. The motorized articulation 22 comprises a fixed part 22a intended to be fixed to the torso 11, and a mobile part 22b moving the arm 12 relative to the torso. Similarly, the motorized articulation 23 comprises a fixed part 23a fixed to the torso 11, and a mobile part 23b moving the arm 13. The articulation 24 of the head 14 is a link motorized about three axes of rotation. The articulation 24 comprises a fixed part 24a and a mobile part 24b.

According to one aspect of the invention, the robot comprises a device for prepositioning and removably fixing the limbs 12, 13 and 14 to the torso 11. The device comprises:

for each of the limbs 12, 13 and 14, means for prepositioning said limb on the trunk 11, and a single flange 25 linked to the trunk 11 and configured to removably fix all the limbs to the trunk 11.

The flange 25 is mobile relative to the torso 11 between an open position represented in FIG. 2a and a closed position represented in FIG. 2c. FIG. 2b represents the flange in a position that is intermediate to the open position and to the closed position. The flange 25 is linked to the torso 11 by means of a pivot link 26 of horizontal axis. The pivot link 26 is arranged in the lower part of the flange and configured such that the open position of the flange is stable by the effect of gravity, or, in other words, such that the flange is kept in the open position by the effect of gravity. The open position of the flange represented in FIG. 2*a* is configured to allow an operator of the robot to access the articulations of the limbs, and to mount and dismantle each of the limbs.

The flange can be kept in the closed position by removable fixing means. In the example represented, the holding in the closed position is ensured by four screws (not represented) passing through an upper part of the flange and cooperating with four nuts 27, provided on the torso, and distributed along a horizontal axis. In the closed position represented in FIG. 2*c*, the flange 25 comes to bear against the motorized articulations, so as to simultaneously ensure the fixing of all the limbs relative to the torso.

Advantageously, the flange comprises a cellular structure consisting of a rigid thermoplastic material similar to that of the supporting structure of the torso.

Note that FIG. 2*c* represents an outer shell 11*b* partially covering the torso 11. An outer shell entirely covering the torso 11 is envisaged. Covering the flange 25 with an outer shell is also envisaged. The outer shells advantageously comprise a surface treatment giving the trunk of the robot an aesthetic appearance.

Figure 3A:
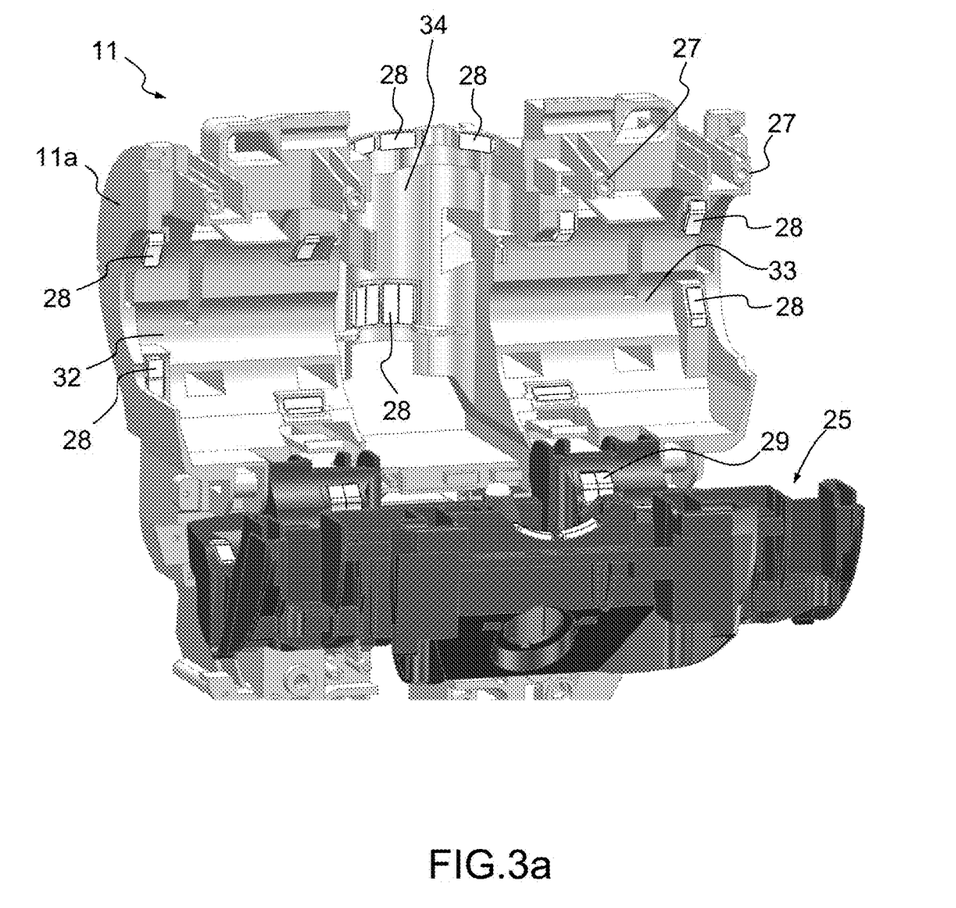
FIGS. 3a and 3b represent, according to two perspective views, the trunk and the flange in the open position.
Figure 3B:
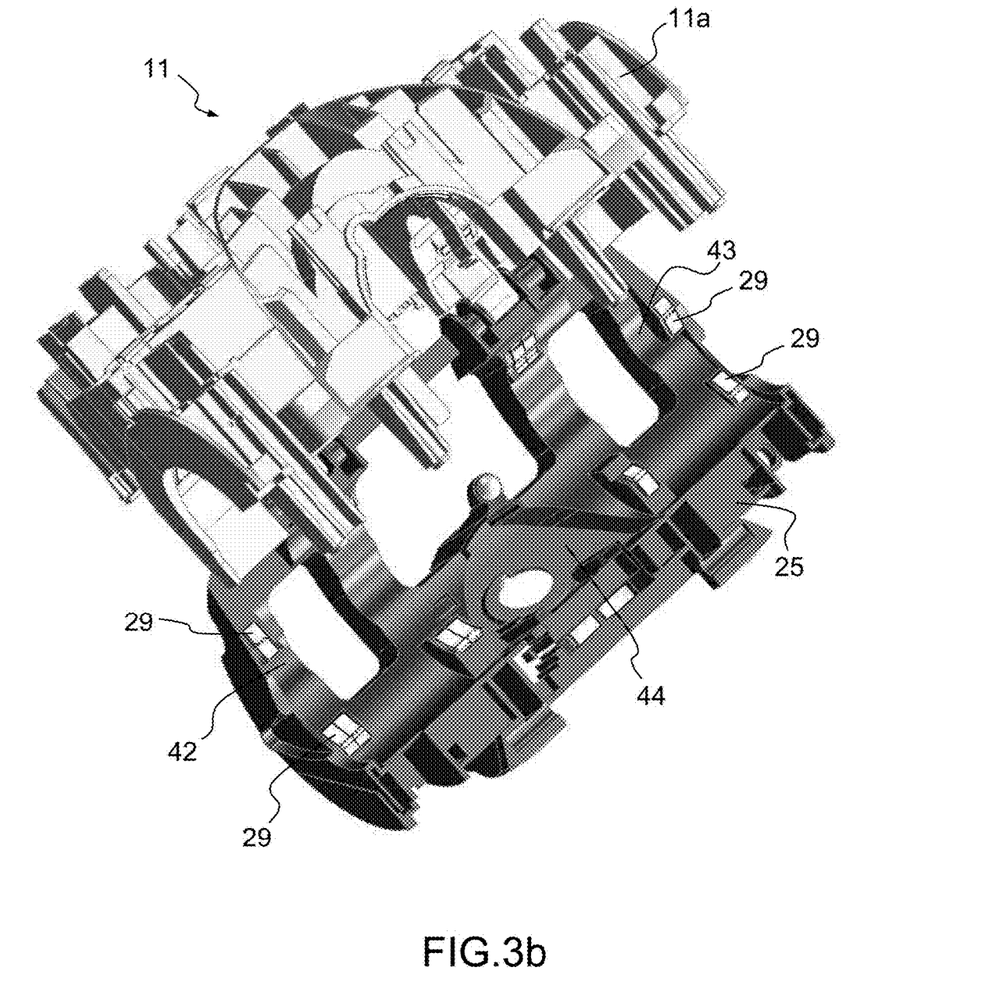

FIGS. 3*a* and 3*b* represent, according to two perspective views, the trunk and the flange in the open position. The device ensures the prepositioning and the fixing of the limbs via their motorized articulation. Each of the limbs 12, 13 and 14 has an associated imprint formed in the torso 11, respectively referenced 32, 33 and 34. Each of the imprints is configured to receive the motorized articulation of the associated limb. Thus, the imprint 32 of substantially semi-tubular form is configured to receive the fixed part 22*b* of substantially cylindrical form of the motorized articulation 22.

Similarly, an imprint associated with each of the limbs is formed in the flange. The flange 25 comprises three imprints 42, 43 and 44 associated respectively with the limbs 12, 13 and 14. Each of the imprints, of substantially semi-tubular form, is intended to closely follow, when the flange is in the closed position, the substantially cylindrical form of the fixed part of the articulations of each of the limbs.

The prepositioning and removable fixing device also comprises a first set of flexible shims 28 secured to the torso and positioned in the imprints 32, 33 and 34 of the torso so as to come to be inserted between the rigid supporting structure and the fixed part of the motorized articulation of the limbs. The device also comprises a second set of flexible shims 29 secured to the flange, positioned notably in the imprints 42, 43 and 44 of the flange so as to come to be inserted, when the flange is in the closed position, between the flange and the fixed part of the motorized articulation of the limbs.

In a preferred implementation of the invention, the flexile shims 28 and 29 are made of an elastomer foam material. Thus, the flexible shims are advantageously configured to be partially crushed when the flange is in the closed position so as to ensure a balanced and non-hyperstatic holding of the motorized articulation of each of the limbs relative to the torso.

Figure 4A:
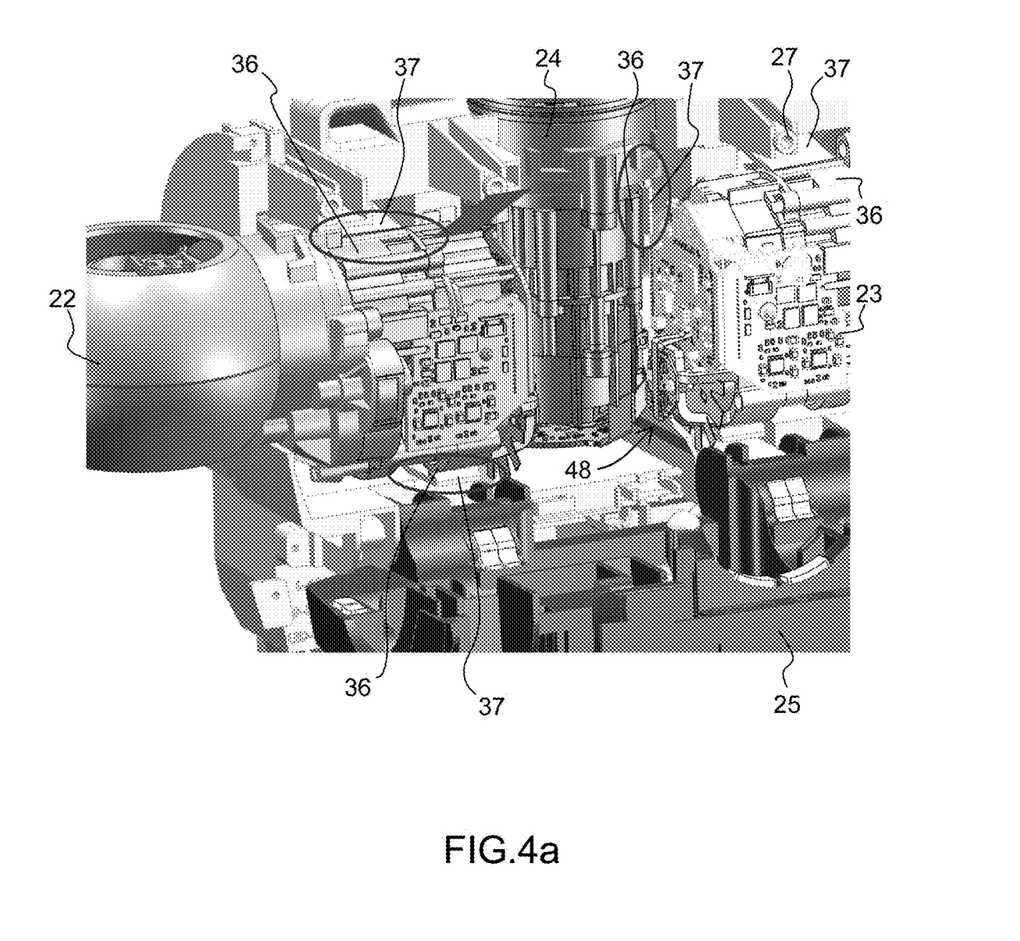
FIGS. 4a and 4b represent means for preposition and fixing articulated limbs to the trunk of the robot.
Figure 4B:
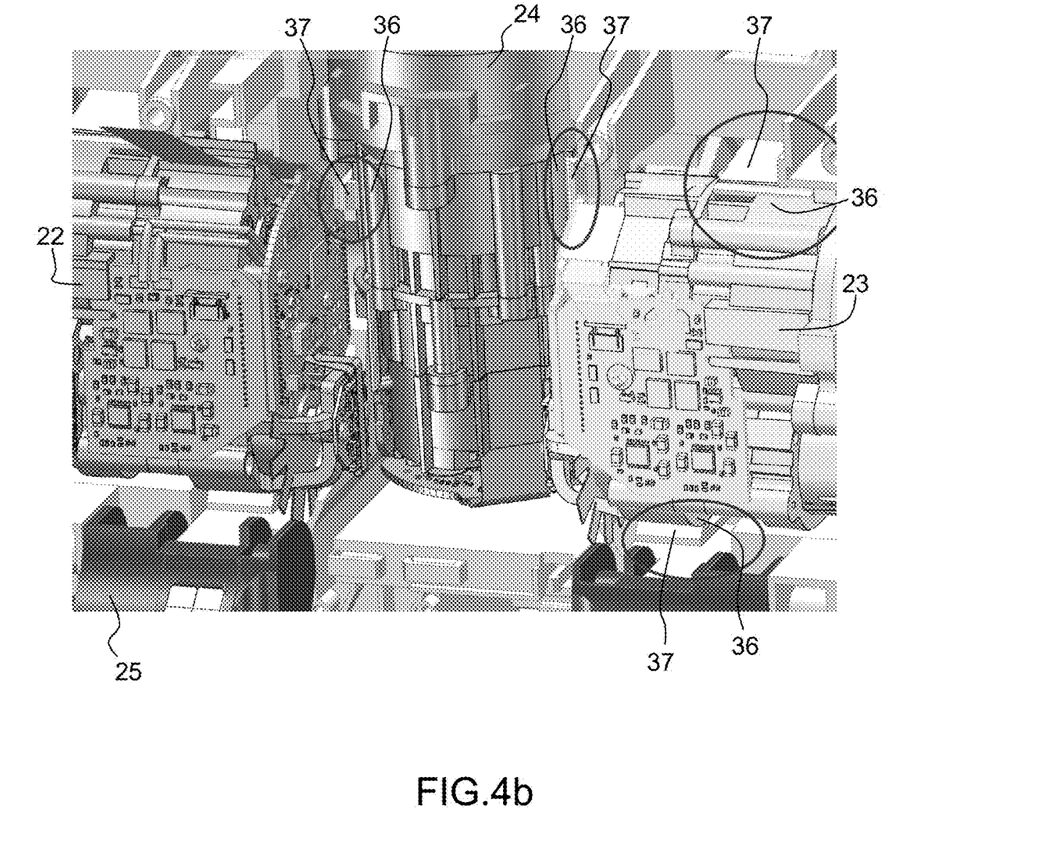

FIGS. 4*a* and 4*b* detail the means for prepositioning and removably fixing the articulated limbs to the trunk of the robot. According to an advantageous aspect of the invention, the device comprises prepositioning means associated with each of the limbs and removable fixing means capable of fixing, by means of a single flange, all the limbs. For each of the limbs, the prepositioning means comprise, on the one hand, the imprint formed in the torso associated with said limb, as previously described by means of the references 32, 33 and 34. They also comprise means for clipping the motorized articulation in the imprint so as to position and hold said limb relative to the trunk. Various embodiments of the clipping means can be envisaged without departing from the scope of the invention. In the example represented in the figures, the clipping is done by means of a set of longitudinal ridges 36 formed on the cylindrical fixed part of the articulation, intended to come into contact with a set of rails 37 formed in the structure of the torso in proximity to the imprint. When the articulation is mounted, the fixed part is first of all placed facing the imprint, then it is clipped by pressing the fixed part against the imprint of the torso. The force exerted by an operator on the fixed part makes it possible, by elastic deformation of the structure of the torso, to displace the rails 37 until they allow the passage of the ridges 36. After the ridge has passed, the rail reverts to position. The fixed part is then held in the imprint of the torso bearing against the flexible shims, by the set of ridges and of rails. When the articulation is dismantled, an operator exerts a force against one of the rails 37 so as to make it possible to extract the articulation from the imprint of the torso. The prepositioning means can advantageously be configured so as to exert a force, between the articulation and the torso, greater than the force exerted by simple gravity between the torso and the limb. Thus, the clipping means make it possible to position and temporarily hold the limb relative to the torso without the limb being able to leave its housing and drop through the effect of gravity, without deliberate outside intervention from the operator.

The device can also comprise removable electronic connection means between the torso and at least one limb. In the example represented, the device comprises removable connection means between the torso and each of the limbs. The electronic connection means are configured to allow for the electrical powering and electronic driving of the motorized articulation and/or of other electrical devices, such as sensors, (microphone, optical sensor, etc.) or actuators (articulations of the elbow, of the hand, etc.). Advantageously, the device can be configured such that the clipping of the limb makes it possible to both preposition the limb and connect the limb to the torso. The unclipping of the limb also ensuring the disconnection of the removable electronic connection means. Removable electronic connection means 48 are represented in FIG. 4*a*.

The invention relates to the device for prepositioning and removably fixing limbs relative to the trunk of the robot. It relates also to a robot equipped with such a prepositioning and fixing device. The invention relates also to the method for mounting and dismantling limbs of such a robot. The operation for mounting a limb of a robot provided with the prepositioning and fixing device then comprises steps consisting in:

prepositioning the limb relative to the torso using the prepositioning means; this step comprising sub-steps consisting in:

introducing the fixed part of the articulation of the limb into the torso and placing it facing the associated imprint in the torso, clipping the fixed part in the imprint on the torso so as to preposition the limb relative to the torso, fixing the limb to the torso using the removable fixing means; this step comprising sub-steps consisting in:
  displacing the flange from the open position to the closed position,
  fixing the flange to the torso using the removable fixing means; the fixed part of the articulation being held in position relative to the torso by means of the flange partially crushing the flexible shims fixed to the torso and to the flange.

By a reverse method the operation for dismantling a limb of a robot provided with the prepositioning and fixing device comprises steps consisting in:
  removing the fixing means from the flange,
  displacing the flange from the closed position to the open position,
  unclipping the fixed part of the motorized articulation of said limb by imposing a force greater than the clipping force,
  removing the fixed part of the motorized articulation from the imprint of the torso.

The invention relates finally to a maintenance method for a robot, or more specifically to a method for replacing a failing limb of a robot provided with a prepositioning and removable fixing device by a non-failing limb. The replacement method comprises steps consisting in:
  removing the removable fixing means,
  displacing the flange from the closed position to the open position,
  removing said failing limb,
  prepositioning said non-failing limb in the imprint associated with the limb to be replaced,
  displacing the flange to the closed position,
  refitting the fixing means.

Note that when the device comprises removable electronic connection means, the method for replacing a failing limb further comprises a step consisting in disconnecting the removable electronic connection means, between the torso and the failing limb—this step being performed before or simultaneously with the step of removal of the failing limb—and a step consisting in connecting the removable electronic connection means, between the torso and the non-failing limb—this step being performed before or simultaneously with the step of prepositioning of the non-failing limb.

The invention claimed is:

1. A mobile robot comprising a trunk and a plurality of limbs removably linked to the trunk, comprising:
  for each limb of said plurality of limbs, means for prepositioning said each limb on the trunk, and
  a single flange linked to the trunk and configured to removably fix all the limbs to the trunk,
  wherein each limb of the plurality of limbs comprises a motorized articulation, via which said each limb is positioned and fixed onto the trunk, and can be driven in movement relative to the trunk.

2. The robot as claimed in claim 1, wherein the prepositioning means associated with one of the limbs comprise an imprint formed in the trunk configured to receive the motorized articulation of said limb, and means for clipping the motorized articulation in the imprint, so as to position and hold said limb relative to the trunk by exerting a force greater than a force exerted by gravity between the trunk and said limb.

3. The robot as claimed in claim 2, wherein the clipping means of one of the limbs comprise a set of ridges formed in the motorized articulation cooperating with a set of rails formed in the imprint associated with said limb.

4. The robot as claimed in claim 2, wherein the flange is mobile relative to the trunk between an open position making it possible, for each of the limbs, to position and remove the motorized articulation relative to the trunk, and a closed position in which the flange comes to bear against the motorized articulations of all the limbs; the robot comprising removable fixing means for holding the flange in the closed position.

5. The robot as claimed in claim 4, wherein the flange is linked to the trunk by a pivot link configured to make it possible to displace the flange in rotation, between the open position and the closed position, and configured so that the flange is held in the open position by the effect of gravity.

6. The robot as claimed in claim 4, comprising, for one of the limbs, a first and a second set of flexible shims, secured respectively to the flange and the imprint associated with said limb, configured to be crushed, ensuring that the motorized articulation is kept positioned and fixed onto the trunk.

7. The robot as claimed in claim 6, wherein the flexible shims are made of an elastomer foam.

8. The robot as claimed in claim 1, comprising, for each of the limbs, removable electronic connection means.

9. The robot as claimed in claim 1, wherein the articulation of one of the limbs is motorized about two or three axes of rotation.

10. The robot as claimed in claim 1, comprising three limbs, one of the limbs articulated about three axes of rotation relative to the trunk being, and two of the limbs articulated about two axes of rotation relative to the trunk and arranged on either side of the trunk.

11. A method for replacing a failing limb of a robot as claimed in claim 4 with a non-failing limb, comprising steps:
  removing the removable fixing means,
  displacing the flange to the open position,
  removing the failing limb,
  prepositioning the non-failing limb in the imprint associated with the failing limb,
  displacing the flange to the closed position,
  refitting the fixing means.

12. The method as claimed in claim 11, said robot comprising for each of the limbs, removable electronic connection means, further comprising steps respectively disconnecting and connecting the electronic connection means between the robot and respectively the failing limb and the non-failing limb.

* * * * *

UNITED STATES PATENT AND TRADEMARK OFFICE
CERTIFICATE OF CORRECTION

PATENT NO. : 10,259,125 B2
APPLICATION NO. : 15/311100
DATED : April 16, 2019
INVENTOR(S) : Ludovic Houchu et al.

It is certified that error appears in the above-identified patent and that said Letters Patent is hereby corrected as shown below:

In the Claims

In Claim 10, Column 8, Line 38, "to the trunk being," should be -- to the trunk, --.

Signed and Sealed this
Ninth Day of July, 2019

Andrei Iancu
*Director of the United States Patent and Trademark Office*